US008698054B2

(12) United States Patent
Lasko

(10) Patent No.: US 8,698,054 B2
(45) Date of Patent: Apr. 15, 2014

(54) INTEGRAL INDUCTOR-SUSCEPTOR

(75) Inventor: Bernard C. Lasko, Spartanburg, SC (US)

(73) Assignee: Bernard Lasko, Spartanburg, SC (US)

( * ) Notice: Subject to any disclaimer, the term of this patent is extended or adjusted under 35 U.S.C. 154(b) by 186 days.

(21) Appl. No.: 12/883,502

(22) Filed: Sep. 16, 2010

(65) Prior Publication Data

US 2012/0067870 A1 Mar. 22, 2012

(51) Int. Cl.

*H05B 6/10* (2006.01)
*B29C 65/00* (2006.01)
*B01F 15/06* (2006.01)
*C22B 21/00* (2006.01)

(52) U.S. Cl.

USPC ........... 219/634; 219/600; 219/633; 219/672; 219/674; 219/660; 156/274.2; 156/380.2; 156/274.4; 366/146; 366/316; 266/200; 266/237

(58) Field of Classification Search

USPC ......... 219/634, 600, 633, 672, 674, 660, 604, 219/676, 677; 156/274.2, 380.2, 274.4; 366/146, 316; 266/200, 237
See application file for complete search history.

(56) References Cited

U.S. PATENT DOCUMENTS

| | | | | |
|---|---|---|---|---|
| 2,040,760 | A * | 5/1936 | Northrup | 219/645 |
| 3,397,297 | A * | 8/1968 | McCorry | 219/670 |
| 4,195,214 | A * | 3/1980 | Gerber | 219/670 |
| 5,313,034 | A * | 5/1994 | Grimm et al. | 219/765 |
| 5,760,379 | A * | 6/1998 | Matsen et al. | 219/633 |
| 5,919,387 | A * | 7/1999 | Buckley et al. | 219/633 |
| 6,048,599 | A * | 4/2000 | Chu et al. | 428/114 |
| 6,649,888 | B2 * | 11/2003 | Ryan et al. | 219/634 |
| 2003/0010775 | A1 * | 1/2003 | Kim | 219/634 |
| 2006/0001379 | A1 * | 1/2006 | Hecker et al. | 313/623 |
| 2008/0191391 | A1 * | 8/2008 | Lasko | 264/431 |

* cited by examiner

*Primary Examiner* — Dana Ross
*Assistant Examiner* — Ket D Dang
(74) *Attorney, Agent, or Firm* — Bracewell & Giuliani LLP

(57) ABSTRACT

An induction heating inductor and perforated susceptor are formed as an integral unit to provide a low cost, physically stable, efficient, and easily cleaned unit.

20 Claims, 2 Drawing Sheets

INTEGRAL INDUCTOR-SUSCEPTOR

FIELD OF THE INVENTION

An inductor coil is bonded to the surface of an electrically insulated perforated steel susceptor to form an integral unit for inductively coupling energy from the inductor to the susceptor.

BACKGROUND OF THE INVENTION

Solid to liquid transformations by technology described in Lasko patents U.S. Pat. No. 5,584,419 and U.S. Pat. No. 7,755,009 require inductor coil forms that often impede material flow. Solid or particulate form electrically nonconductive materials are presented to one surface of an inductively heated perforated susceptor for melt transformation upon passing to the other side by gravity flow or mechanical pressure. When the susceptor form is a disc, it acts as a face of a cylindrical container for the process material. A cone form susceptor acts as a conical end of a cylindrical container. A cylinder form susceptor is a portion of the cylindrical container. These shapes are necessarily fully radial to accomplish an evenly distributed coupling of the magnetic field. The objective of the inductor coil design for this melting process is to distribute the magnetic field intensity in proportion to the volume flow over the surface of the susceptor. Efficient transfer of energy to the susceptor requires placement of the individual inductor elements in close proximity to the susceptor surface. The number of elements [off-set concentric turns or spiral turns] per unit area of the susceptor surface is varied to distribute the magnetic field intensity and resulting energy transfer from the inductor coil to the susceptor. These variations control the influence of the inductor coil magnetic field edge effect and inter-turn deviation [flux leakage].

Sheets of industry standard staggered round hole perforated steel are used to construct susceptors of disc, cone and cylinder form. The size and number of perforations in the susceptor are chosen to maximize the surface area of the susceptor for thermal conduction to the process material, while restricting open area to preserve thin sheet strength and adequate cross sectional area for even induced current flow. The thermal conductivity and temperature variable viscosity of the process material further defines the hole size. An open area of approximately 50% meets this requirement for most materials. The material must flow through the susceptor in unimpeded volume related to the energy transferred at any point on the susceptor to impart a homogeneous material temperature.

Processing different materials in the same apparatus requires purging the previous material with the new material. Additional surfaces of inductor coil supports and the coil occupied area add to the volume of material lost to this process. Lesser viscosity materials in gravity flow will not adequately displace materials of greater viscosity. Removing the inductor and susceptor for chemical cleaning is not an attractive alternative. The process start and stop interval is lengthened by the total thickness of the inductor coil and susceptor assembly. Because the susceptor is the material containment vessel or a part there of, support for this item in the apparatus is complicated by the necessary close proximity position of the inductor coil.

This invention provides a method of meeting these physical and electrical requirements by direct placement of the inductor coil on the susceptor surface and perforating the inductor coil with axis and diameter coincident holes. The hydraulic pressure required to pass material through this thermal interface is reduced to that of the susceptor alone. The inductor coil does not need to be separately supported in the material flow path. Similar materials can be processed with minor volume displacement of the previous material in the apparatus. Extraction of the integral inductor-susceptor for chemical cleaning is made practical by requiring only the removal of an electrical connection and striping the surface of a single unit of simple form.

When the adjacent inductor coil material is axis coincidentally perforated, its electrical conducting cross section is diminished. The resistance of the total remaining conductor cross-section must remain low enough to support the desired amount of high frequency current having electrical energy losses that are thermally transferable to the process material. The thickness of the inductor coil is increased to preserve the required minimum cross section.

The inductor is made integral with the susceptor by direct placement on an electrically insulated susceptor surface. This bond provides an accurate and mechanically stable orientation of the inductor in closest proximity of the susceptor. This is achieved in one embodiment of the invention by plating the inductor coil on one or both surfaces of a porcelain enamel coated perforated steel disc. The perforated sheet steel disc is etched to radius the holes edges and decarburize the surface. The entire disc surface and holes are coated with 0.009" of porcelain enamel. The disc is electroless copper plated, pattern masked, etched, striped, electroplated, and refired. The coefficient of thermal expansion of the steel disc susceptor, porcelain enamel coating, and copper overlay are close enough to maintain an effective bond for typical maximum process temperature excursions of 400° F.

The process residency time for most thermoplastic materials is a few seconds. Power applied at 20 to 50 watts/sq." will melt most thermoplastic materials at gravity pressure on the susceptor surface. The frequency of the power applied to the inductor coil is 40 to 100 KHz. The process temperature can be precisely controlled by placing a thermocouple on the susceptor to signal a controller for modulating the high frequency power applied to the inductor.

DETAILED DESCRIPTION OF THE INVENTION

Figure 1:
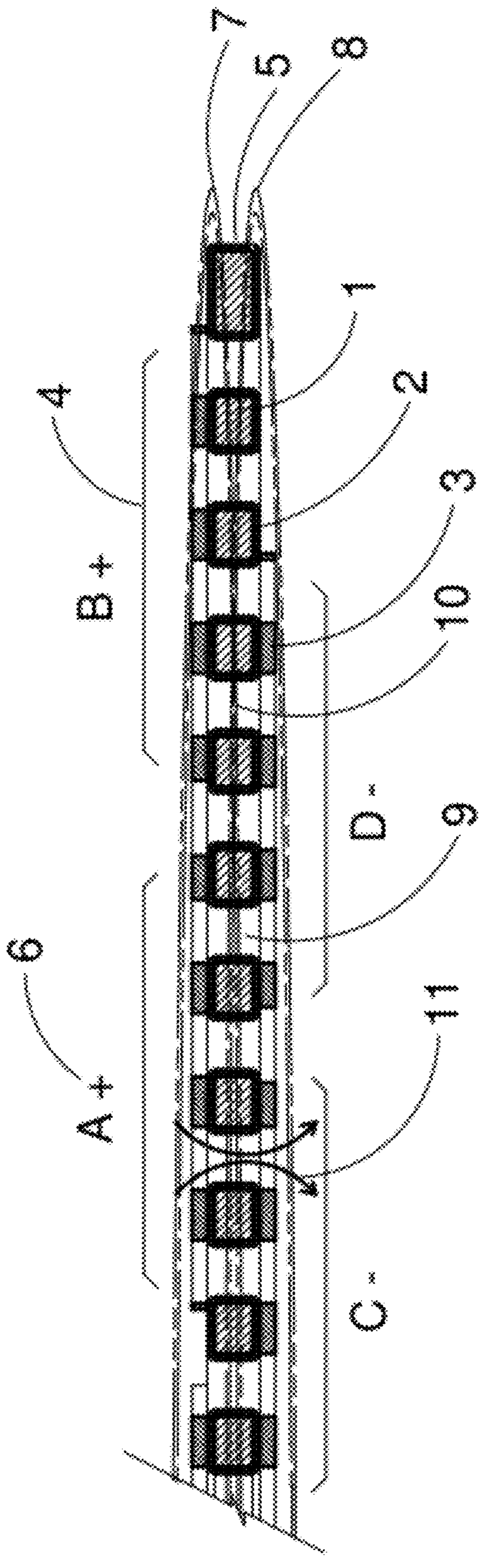
FIG. 1 is a cross section of an integral inductor/susceptor.

FIG. 1 is a cross section of the edge of a 15" dia. 19 ga. staggered pattern perforated sheet steel disc susceptor 1. Susceptor 1 is coated with 0.009" porcelain enamel 2. Magnetic field inductor coil 3 is constructed of 22 rectangular turns of copper alloy screen printed and plated to 0.020" thickness on the porcelain enamel 2 surfaces. Individual inductor coil turns 4 are identified as A through D. Turns A and B are the first and second turns of the inductor introduced at edge HF power entry point 5. Holes in the center position turn are plated as a printed circuit via to pass current to the opposite side of susceptor 1. A mirror image of inductor coil 3 is placed on the opposite side of the susceptor to return the current to edge HF power entry point 5. The polarity signs (+/–) 6 indicate the instantaneous half cycle direction of the current flow required to make the magnetic fields 7 and 8 additive as intercepted by the susceptor. The field force lines 9 intercept the susceptor 1 with equal intensity. All susceptor holes 10 are 0.094" diameter prior to applying porcelain enamel 2. Arrows 11 indicate the flow of melting material passing through the integral inductor-susceptor. This arrangement of the coil and susceptor results in minimum heat energy remaining in the inductor-susceptor as power is turned off. It is most appropriate for applications where a fast start-stop of the melt flow is desirable.

Figure 2:
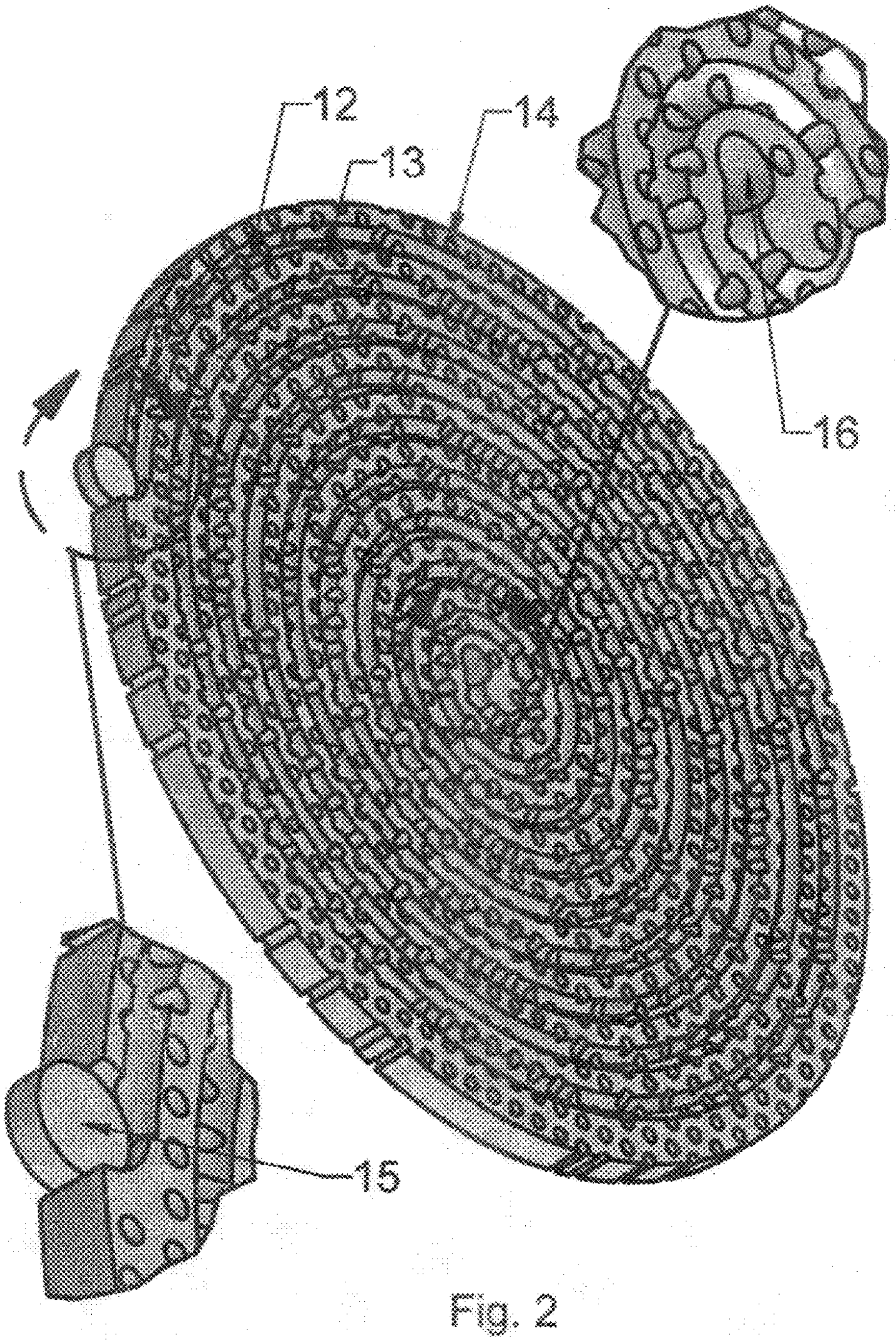
FIG. 2 is an isometric view of an integral inductor-susceptor having axis coincident perforations and showing an enlarged portion at a center of the susceptor and another enlarged portion at the periphery of the susceptor.

FIG. 2 is a shaded isometric view of a 90° segment of a coated perforated disc susceptor with strips of a spiral copper coil 12 bonded to the insulation coating on opposite sides of the susceptor 13. Susceptor 13 is a flat plate of conductive metal, preferably sheet steel and has a circular periphery in FIG. 2. The individual turns 12 of the inductor coil are of differing width to even the magnetic field intensity profile across the disc. The perforated disc susceptor 13 is coated with 0.009" thick porcelain enamel that is too thin to depict relative to its 0.040" thickness and the individual turns 12 thickness of 0.020". Perforation holes 14 in individual turns 12 are axis aligned with those of susceptor 13. Staggered hole perforated sheet steel is preferred for this construction to aid in preserving individual turn cross section at all segments of its track.

As shown in the enlarged portion of the periphery of the disc susceptor 13, two electrical connector tabs 15 are located at the periphery of disc susceptor 13 and spaced apart from each other. Each connector 15 joins an outer terminal end of the turns 12 on one side of susceptor 13 at the periphery. As shown in the enlarged portion of the central area of susceptor 13, a conductive link 16 extends through a central one of the perforation holes 14 in susceptor 13 and joins the inner end of turns 12 on one side of susceptor 13 with the inner end of turns 12 one the other side of susceptor 13. Conductive link 16 is a conductive metal coating on the edge of the central one of the perforation holes 14. A conductive path extends from connector tab 15 on one side of susceptor 13 through turns 12 on that side to conductive link 16. From conductive link 16, the conductive path extends through turns 12 on the opposite side of susceptor 13 to the connector tab 15 on the opposite side. High frequency electrical power is connected to connector tabs 15.

I claim:

1. A susceptor for heating work product materials, comprising:
- a plate of electrically conductive material having oppositely facing first and second side surfaces and an axis;
- a non-conductive coating on the first and second side surfaces of the plate;
- electrically conductive first and second strips, the first strip being bonded to the coating on the first side surface of the plate, the second strip being bonded to the coating on the second side surface of the plate, each of the strips extending continuously in turns around the axis;
- a first electrical connector tab on of the first side surface and joining one end of the first strip;
- a second electrical connector tab on the second side surface and joining one end of the second strip;
- a conductive link electrically joining opposite ends of the first and second strips to each other so that an electrical current path extends from first electrical connector tab through the first strip and conductive link and back through the second strip to the second electrical connector tab; and
- a plurality of holes in the plate extending from the first side surface to the second side surface.

2. The susceptor according to claim 1, wherein at least some of the holes extend through the coating and each of the strips.

3. The susceptor according to claim 1, wherein:
- the conductive link extends through one of the holes in the plate.

4. The susceptor according to claim 1, wherein:
- the plate is a flat disc; and
- the axis is in a center of the disc perpendicular to each of the side surfaces.

5. The susceptor according to claim 1, wherein:
- the plate is a flat disc having a circular periphery; and
- each of the connector tabs is located at the periphery.

6. The susceptor according to claim 1, wherein:
- the plate is a flat disc;
- the axis extends through a center of the disc;
- a center one of the holes is located on the axis; and
- the conductive link extends through the center one of the holes.

7. The susceptor according to claim 1, wherein:
- the plate is a flat disc having a circular periphery;
- the axis extends through a center of the disc;
- a center one of the holes is located on the axis;
- each of the connector tabs is located at the periphery; and
- the conductive link extends through the center one of the holes.

8. The susceptor according to claim 1, wherein each of the strips comprises a copper plating.

9. The susceptor according to claim 1, wherein:
- at least some of the turns of the first strip have widths that differ from others of the turns of the first strip; and
- at least some of the turns of the second strip have widths that differ from others of the turns of the second strip.

10. The susceptor according to claim 1, wherein the plate is formed of sheet steel.

11. The susceptor according to claim 1, wherein each of the first and second strips extends in a spiral pattern located in a single plane.

12. The susceptor according to claim 1, wherein the first and second side surfaces of the plate are parallel with each other.

13. The susceptor according to claim 1, wherein the plate is formed of sheet steel and the first and second strips are formed of copper.

14. A susceptor for heating work product materials, comprising:
- a plate of electrically conductive material having a central portion with a central axis, a peripheral portion and oppositely facing first and second side surfaces;
- an electrical insulation coating on the first and second side surfaces of the plate;
- an electrically conductive first strip plated on the coating on the first side surface of the plate, the first strip having a first terminal end adjacent the periphery on the first side surface and extending continuously in turns around the axis in a spiral pattern from the first terminal end to the central portion of the plate;
- an electrically conductive second strip plated on the coating on the second side surface of the plate, the second strip having a second terminal end adjacent the periphery on the second side surface and extending continuously in turns around the axis in a spiral pattern from the second terminal end to the central portion of the plate;
- a central hole located on the axis in the central portion of the plate;
- a link of electrically conductive material plated on an edge of the central hole and electrically joining the first and second strips so that an electrical current path extends from the first terminal end to the second terminal end; and a plurality of perforations in the plate extending from the first side surface to the second side surface.

15. The susceptor according to claim 14, wherein at least some of the perforations extend through the coating and each of the strips.

16. The susceptor according to claim 14, wherein the plate is flat.

17. The susceptor according to claim 14, wherein:

at least some of the turns of the first strip have widths that differ from others of the turns of the first strip; and at least some of the turns of the second strip have widths that differ from others of the turns of the second strip.

18. The susceptor according to claim 14, further comprising electrical connector tabs at the first and second terminal ends for joining the strips to high frequency electrical power.

19. The susceptor according to claim 14, wherein the peripheral portion of the plate is circular.

20. A method of melting a work product material, comprising:

applying a non-conductive coating to oppositely-facing first and second side surfaces of a plate of electrically conductive material;

bonding an electrically conductive first strip to the coating on the first side surface of the plate, and bonding an electrically conductive second strip to the coating on the second side surface of the plate, each of the strips extending continuously in turns around an axis of the plate from a terminal end to a linking end;

electrically joining the linking ends of the strips;

providing a plurality of holes in the plate extending from the first side surface to the second side surface;

applying electrical energy to the terminal ends of the first and second strips, creating a magnetic field that heats the plate; and heating the work product material with the heat from the plate, and causing the work product material to flow through the holes between the first and second side surfaces.

* * * * *